(12) United States Patent
Khelifa et al.

(10) Patent No.: US 6,199,397 B1
(45) Date of Patent: Mar. 13, 2001

(54) AIR CONDITIONING INSTALLATION WITH ACTIVATED CARBON FILTER

(75) Inventors: Noureddine Khelifa; Horst Jirmann, both of Coburg (DE)

(73) Assignee: Valeo Climatisation, La Verriere Ceder (FR)

( * ) Notice: Subject to any disclaimer, the term of this patent is extended or adjusted under 35 U.S.C. 154(b) by 0 days.

(21) Appl. No.: 09/382,884

(22) Filed: Aug. 25, 1999

(30) Foreign Application Priority Data

Aug. 27, 1998 (DE) ............................................... 198 38 996

(51) Int. Cl.$^7$ ...................................................... F25D 17/04
(52) U.S. Cl. ................................................. 62/317; 62/239
(58) Field of Search .............................. 62/317, 239, 243, 62/244

(56) References Cited

U.S. PATENT DOCUMENTS

| | | | |
|---|---|---|---|
| 4,696,225 | * | 9/1987 | Weller ................................. 55/303 X |
| 5,954,577 | * | 9/1999 | Meckler ............................. 55/473 X |

FOREIGN PATENT DOCUMENTS

| | | | |
|---|---|---|---|
| 19603866 | * | 1/1992 | (DE) . |
| 196 03 866 | | 8/1997 | (DE) . |
| 196 24 216 | | 1/1998 | (DE) . |
| 196 43 492 | | 4/1998 | (DE) . |
| 196 53 964 | | 6/1998 | (DE) . |
| 2248195 | * | 1/1992 | (GB) . |

OTHER PUBLICATIONS

Germany Search Report dated Jan. 29, 1999.

* cited by examiner

*Primary Examiner*—Corrine McDermott
*Assistant Examiner*—Chen-Wen Jiang
(74) *Attorney, Agent, or Firm*—Morgan & Finnegan, LLP

(57) ABSTRACT

An air conditioning installation is supplied with an activated carbon filter for cleaning the air to be supplied to the interior of a motor vehicle. A device is provided for cleaning the air filter and the air therein by heating, and air laden with by-products may be driven out of the filter by means of a cleaning airflow. The activated carbon is in physical contact with a temperature regulated or temperature controlled heating device, with which the activated carbon and the air present in the filter can be heated, while the cleaning airflow flows through the filter.

29 Claims, 2 Drawing Sheets

AIR CONDITIONING INSTALLATION WITH ACTIVATED CARBON FILTER

FIELD OF THE INVENTION

The invention relates to an air-conditioning installation with an activated carbon filter for cleaning the air to be supplied to the interior of a motor vehicle, in which a device is provided for cleaning by heating of the filter and the air therein, and air laden with by-products can be driven out of the filter by a cleaning airflow.

BACKGROUND OF THE INVENTION

It is known to equip air-conditioning installations of motor vehicles with filters, particularly with activated carbon filters. The filters clean the air being supplied to the vehicle interior of strongly smelling and/or toxic components. However, the absorbing power of activated carbon drops off over time, so that the activated carbon has to be cleaned or exchanged. Because the exchanging of the activated carbon filter, particularly with motor vehicles, is associated with high expenditure and high cost, ways for effective regeneration of the activated carbon are sought.

It is known, for example, to install a heating device, on the air intake side, in series with the activated carbon filter. The heating device heats up the airflow through the filter and hence the filter itself, and which leads to a desorption of the residues in the filter. The contaminated airflow can then be led away to the environment. The disadvantage of this series-connected heating it is that the cleaning takes place in an adiabatic process. Because the airflow is cooled down on passing through the filter by vaporising of the contamination, the desorption process is longer and hence the external energy consumption for the blower is comparatively high.

On the other hand, filters with activated carbon filling are known, in which rod-shaped electrical heating elements are inserted directly into the mass of activated carbon, so that they heat the activated carbon itself. With the heating rods inserted vertically, it is not possible to heat the entire filter uniformly.

It is a further disadvantage that the heat conduction into the activated carbon surrounding the heating rod is so slight that the heating rods have to be heated to a particularly high temperature in order to produce a sufficient temperature for the cleaning. The heating rods, heated to high temperature, therefore present a great danger as regards ignition of the carbon in contact with the heating rods. A cleaning installation of this type does not meet modern-day safety standards, so that it is impossible to install it in motor vehicles.

OBJECT OF THE INVENTION

Hence the object of the invention is to provide an air-conditioning installation for motor vehicles, with a facility for cleaning the activated carbon filter in which risk-free and effective cleaning is possible at little expense in terms of construction.

SUMMARY OF THE INVENTION

An air-conditioning installation with an activated carbon filter for cleaning the air to be supplied to the interior of a motor vehicle, in which a device is provided for cleaning by heating of the filter and the air therein, and air laden with by-products is driven out of the filter by a cleaning airflow. The activated carbon is in physical contact with a temperature-regulated or temperature-controlled heating device, with which the activated carbon and the air present in the filter can be heated, while the cleaning airflow flows through the filter.

A first advantage of the heating device in accordance with the invention is that, in the uniformly heated filter, isothermal desorption can take place at a pre-set and regulated temperature of, for example, 90° C. In that way cleaning of every area is made possible, and thus a well-nigh complete regeneration of the filter. With heating strips implanted, and particularly with heating elements for PTC heating (Positive Temperature Coefficient heating) whose electrical resistance increases with increasing heating until a cut off, ignition of the activated carbon is precluded. Thus, the heating device in accordance with the invention meets the modern-day safety standards and can be built into motor vehicles. With the heating device in accordance with the invention, the temperature can therefore be continuously monitored, such that control and regulation of the temperature can take place via temperature probes integrated into the filter or positioned after the filter. It is particularly advantageous for even heating of the filter for the heat conduction to be increased by conducting webs. The heating device in accordance with the invention generally offers high dependability with compact installation within the air-conditioning system.

At the same time the heating elements installed in accordance with the invention guarantee low flow resistance in the filter, so that the performance required from the blower motor is comparatively low. This leads to a substantial reduction in the electrical energy requirements.

As an additional advantage, the device in accordance with the invention can be integrated into all normal activated carbon filters, for example in stacks of activated carbon pellets, but particularly in a filter of monolithic form. An advantage of the monolithic form of filter is that it can be particularly well sealed at its edges and therefore preclude leakage flows of uncleaned air. Because the heating strips laid out in loops, or the plate-shaped heating elements of the PTC heating facility arranged essentially horizontally, a particularly uniform heating of the entire filter is guaranteed.

In a particularly simple embodiment, the heating device is formed by a resistive strip, which is embedded in a zig-zag shape in the activated carbon, and through which a defined current flows. This method of heating will advantageously be used when the cleaning takes place on the occasion of an inspection in the workshop and the heating device can be connected to an external selectable supply voltage. In this case it is also advantageous for an external blower to be employed to produce the airflow required for the cleaning. The airflow in this case can be led in through an opening in the blower channel on the intake side of the filter, while contaminated air is led away out of the installation.

In another embodiment, the heating device is connected to the on-board voltage of the motor vehicle, so that cleaning is also possible outside the workshop while the vehicle is in operation. With this cleaning, which is autonomous and thus saves on maintenance costs, it should also be noted that the outgoing air originating from the cleaning can be led away completely out of the blower duct. To that end it is advantageous for the blower duct on the outflow side, after the filter, to have a closable exit aperture, through which air can be removed.

As explained, it is advantageous to install the heating device in solid blocks of activated carbon, which are constructed as honeycomb structures, perforated structures or as bundles of pipes of narrow internal diameter. In order to build in the heating device, recesses are milled into the solid block at the corresponding points at which the heating elements will be installed. In another manufacturing technique, the heating device, which is introduced into a spongy substrate, is enclosed in grown-on or sprayed-on activated carbon.

BRIEF DESCRIPTION OF THE DRAWINGS

Preferred embodiments of the invention will now be described with reference to FIGS. 1 to 4 of the accompanying drawings, in which.

DESCRIPTION OF THE PREFERRED EMBODIMENT

Figure 1:
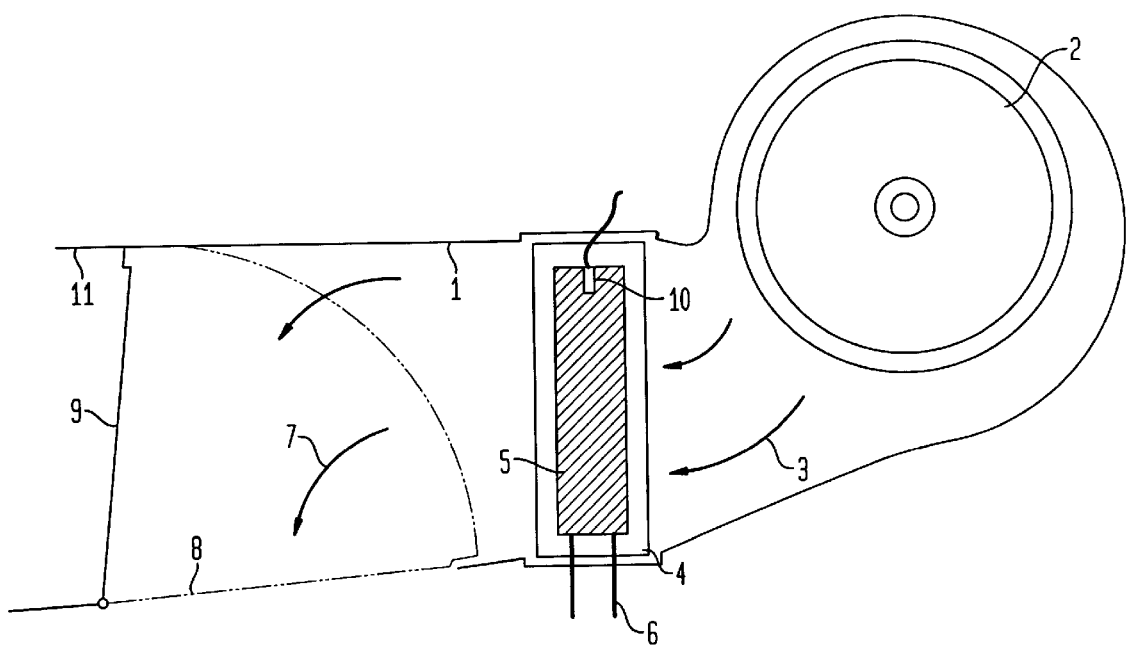
FIG. 1: shows a section through the blower duct of an air-conditioning installation.

In the various figures, like reference numerals indicate like parts.

A cross section through the blower duct 1 of an air-conditioning installation is depicted in FIG. 1. The blower 2 integrated into the air-conditioning installation produces an airflow 3, which before entry into the air-conditioning installation and into the interior of a motor vehicle is led to a filter, here a solid block of activated carbon 4, for cleaning. A heating device 5, which can be supplied with a voltage via the connections 6, is arranged in the filter 4, in physical contact with the activated carbon. By means of the regulated heating device 5 of about 500 W, the filter 4 can be heated uniformly to a temperature of at least 80° C., so that with an appropriately adapted airflow 3 effective cleaning of the filter 4 takes place. A temperature probe 10 is fitted to the filter 4 for monitoring the temperature.

An outlet aperture 8 is provided in the blower duct 1 on the outflow side after the filter 4 for leading out the contaminated air 7, and can be closed off by means of a swinging flap 9. In the present instance the outlet aperture 8 is open, so that the airflow 7 is led away to the environment. In this way the flap 9, in the position depicted, closes off the air duct 11 leading to the heating or air-conditioning installation. By virtue of the isothermal cleaning process in accordance with the invention, the contaminated air 7 leaving the filter is at approximately the same temperature as the heating device itself.

Figure 2A:
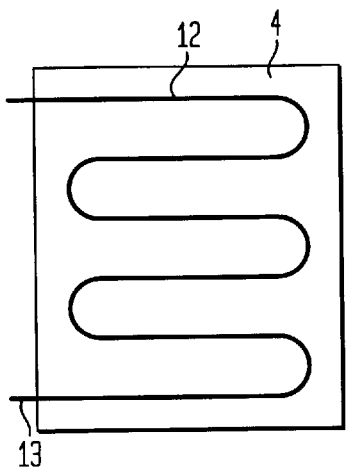
FIG. 2a and 2b show a side view and a top view respectively of an activated carbon filter with heating strip.
Figure 2B:
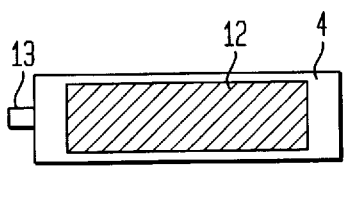
Figure 3B:
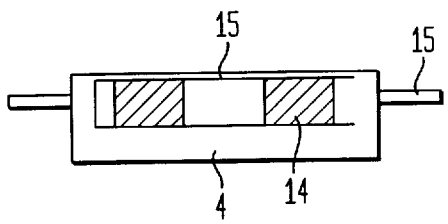

FIG. 2a shows, in a side view, an activated carbon filter 4 with a heating strip 12, which zig-zags through the filter 4 from top to bottom. The heating strip 12 arranged in this way causes uniform heating of the filter 4, with a defined current flow via the contacts 13. The heating strip can be connected via the contacts 13 to an external or intrinsic on-board supply voltage. The top view of FIG. 2b shows that the heating strip 12 occupies almost the entire width of the filter.

Figure 3A:
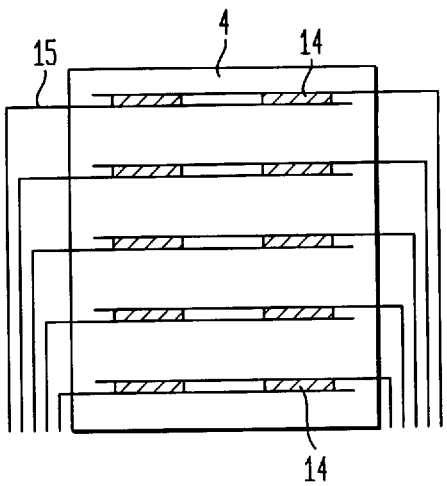
FIG. 3a and 3b show a side view and a top view respectively of an activated carbon filter with heating elements.

FIG. 3a shows an activated carbon filter 4 with heating elements 14, which are distributed regularly in the solid block. The heating elements 14 are of the type known as PTC-heating elements (Positive Temperature Coefficient elements)which have an electrical resistance that increases with increasing heating until a cut off. The heating elements 14 are introduced into recesses in the solid blocks, and are supplied with current via connecting lines 15. In the embodiment depicted, two heating elements 14 at a time arranged at one level are connected via the same connecting lines 15.

The top view shown in FIG. 3a makes it clear that the heating elements 14 once again occupy approximately the entire width of the solid block.

Figure 4A:
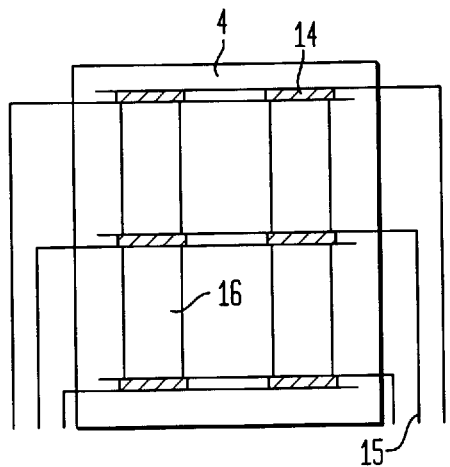
FIG. 4a and 4b show a side view and a top view respectively of an activated carbon filter with heating elements and heat conducting webs.
Figure 4B:
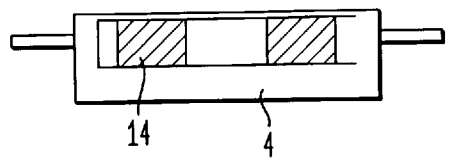

FIGS. 4a and 4b show an embodiment in which the heating elements 14 are connected to each other via conduction webs 16 set vertically in the solid blocks.

What we claim is:

1. An air-conditioning installation with an activated carbon filter for cleaning the air to be supplied to the interior of a motor vehicle, in which a heating device is provided for cleaning by heating of the filter and the air present therein, and in which air laden with by-products can be driven out of the filter by means of a cleaning airflow, wherein the activated carbon is in physical contact with a temperature-regulated or temperature-controlled heating device, with which the activated carbon and the air present in the filter can be heated, an external blower producing the cleaning airflow, while the cleaning airflow flows through the filter the air being led in through an aperture in the blower duct on the intake side of the filter.

2. The air-conditioning installation of claim 1 wherein the heating device has a resistive strip through which a defined current flows, the resistive strip being embedded in a zigzag in the activated carbon.

3. The air-conditioning installation of claim 1 wherein the heating device has electrically operated heating elements, whose resistance increases with increasing heating (Positive Temperature Coefficient).

4. The air-conditioning installation of claim 3 wherein the heating elements are embedded evenly distributed in the activated carbon.

5. The air-conditioning installation of claim 3 wherein the heating elements are connected with each other by heat conducting webs.

6. The air-conditioning installation of claim 1 wherein the heating device is powered from the on-board voltage of the motor vehicle.

7. The air-conditioning installation of claim 1 wherein the heating device can be connected to an external supply voltage.

8. The air-conditioning installation of claim 1 further comprising a blower integrated into the air-conditioning installation to produce the airflow necessary for the cleaning.

9. The air-conditioning installation of claim 1 wherein the blower duct has a closeable exit aperture on the outflow side of the filter, through which the outgoing air originating from the cleaning can be led away.

10. The air-conditioning installation of claim 1 wherein the activated carbon can be heated to temperatures between 80–90° C. by the heating device.

11. The air-conditioning installation of claim 1 wherein a temperature sensor is embedded in or after the filter, which is connected to a temperature regulator or an overheating protection device.

12. The air-conditioning installation of claim 1 wherein the cleaning takes place in an isothermal process.

13. The air-conditioning installation of claim 1 wherein the strength of the cleaning airflow and hence the speed of the airflow through the filter can be adjusted or regulated.

14. The air-conditioning installation of claim 1 wherein the current supply cuts off above an adjustable critical temperature.

15. A vehicle comprising the air-conditioning installation of claim 1.

16. An air-conditioning installation for a vehicle, the air-conditioning installation comprising:

an activated carbon filter for cleaning the air to be supplied to the interior of the vehicle;

a heating device in physical contact with the activated carbon filter, the heating device cleaning the activated carbon filter and the air present therein by heating, the heating device is a temperature-regulated heating device or a temperature-controlled heating device; and an external blower producing an airflow through the activated carbon filter, air laden with by-products driven out of the activated carbon filter by the airflow.

17. The air-conditioning installation of claim 16 wherein the heating device comprises:

a resistive strip through which a defined current flows, the resistive strip embedded in a zigzag pattern in the activated carbon filter.

18. The air-conditioning installation of claim 16 wherein the heating device comprises:

a plurality of heating elements, each heating element having a resistance that increases with increased heat (i.e., a Positive Temperature Coefficient heating element).

19. The air-conditioning installation of claim 18 wherein the heating elements are embedded in and evenly distributed in the activated carbon filter.

20. The air-conditioning installation of claim 18 wherein the heating elements are interconnected by a heat conducting web.

21. The air-conditioning installation of claim 16 wherein the heating device is powered from an on-board voltage of the motor vehicle or an external supply voltage.

22. The air-conditioning installation of claim 16 further comprising an integrated blower which produces the secondary airflow directed at the activated carbon filter.

23. The air-conditioning installation of claim 16 further comprising a blower duct leading to the air intake of the activated carbon filter and leading away from the air outflow of the activated carbon filter, wherein the airflow from the external blower is led in through an aperture in the blower duct to the air intake.

24. The air-conditioning installation of claim 16 wherein the blower duct has an exit aperture proximate the air outflow of the activated carbon filter for venting the air laden with by-products to the vehicle exterior.

25. The air-conditioning installation of claim 16 wherein the heating device heats the activated carbon filter to a temperature between approximately 80° C. and approximately 90° C.

26. The air-conditioning installation of claim 16 wherein a temperature sensor is embedded in or after the activated carbon filter, the temperature sensor connected to a temperature regulator or an overheating protection device that controls the heating device.

27. The air-conditioning installation of claim 16 wherein the heating device cleans the activated carbon filter and the air present therein in an isothermal process.

28. The air-conditioning installation of claim 16 wherein the external blower can be adjusted or regulated to control the strength of the airflow through the filter.

29. The air-conditioning installation of claim 16 wherein the power supplied to the heating device is cut off above an adjustable critical temperature.

* * * * *

UNITED STATES PATENT AND TRADEMARK OFFICE
CERTIFICATE OF CORRECTION

PATENT NO. : 6,199,397 B1
DATED : March 13, 2001
INVENTOR(S) : Horst Jirmann; Noureddine Khelifa It is certified that error appears in the above-identified patent and that said Letters Patent is hereby corrected as shown below:

<u>Title page,</u>
Item [73], replace Assignee: Valeo Climatisation, la Verriere Cedex (FR) with Valeo Klimasysteme GmbH, Rodach (DE)

Signed and Sealed this

Ninth Day of October, 2001

Attest:

NICHOLAS P. GODICI
*Attesting Officer*     *Acting Director of the United States Patent and Trademark Office*